US008658272B2

(12) United States Patent
Bushhouse et al.

(10) Patent No.: US 8,658,272 B2
(45) Date of Patent: Feb. 25, 2014

(54) BASECOAT AND ASSOCIATED PAPERBOARD STRUCTURE INCLUDING A PIGMENT BLEND OF HYPER-PLATY CLAY AND CALCINED CLAY

(75) Inventors: Steven G. Bushhouse, Cary, NC (US); Terry L. Clark, Columbus, GA (US); Gary P. Fugitt, Pittsboro, NC (US); James P. E. Jones, Roswell, GA (US); Anthony V. Lyons, Macon, GA (US); Roger W. Wygant, East Dublin, GA (US)

(73) Assignee: MeadWestvaco Corporation, Richmond, VA (US)

( * ) Notice: Subject to any disclaimer, the term of this patent is extended or adjusted under 35 U.S.C. 154(b) by 385 days.

(21) Appl. No.: 12/763,303

(22) Filed: Apr. 20, 2010

(65) Prior Publication Data
US 2010/0266819 A1    Oct. 21, 2010

Related U.S. Application Data

(60) Provisional application No. 61/171,213, filed on Apr. 21, 2009.

(51) Int. Cl.
B32B 3/10 (2006.01)

(52) U.S. Cl.
USPC ........... 428/161; 428/156; 162/135; 162/136; 162/145; 162/181.8

(58) Field of Classification Search
USPC ........................................ 428/173
See application file for complete search history.

(56) References Cited

U.S. PATENT DOCUMENTS

| 1,913,329 | A | * | 6/1933 | Bradner ........................ 428/173 |
| 3,963,843 | A | * | 6/1976 | Hitchmough et al. ........ 427/361 |
| 4,749,445 | A | | 6/1988 | Vreeland et al. |
| 4,888,983 | A | | 12/1989 | Dunfield et al. |
| 5,298,335 | A | | 3/1994 | Reed et al. |
| 5,320,672 | A | | 6/1994 | Whalen-Shaw |
| 5,576,617 | A | | 11/1996 | Webb et al. |
| 5,631,080 | A | | 5/1997 | Fugitt |
| 5,690,527 | A | | 11/1997 | Rutledge et al. |
| 6,238,473 | B1 | * | 5/2001 | Maxwell et al. .............. 106/486 |
| 6,582,553 | B2 | | 6/2003 | Jewell et al. |

(Continued)

FOREIGN PATENT DOCUMENTS

| EP | 0448332 | 9/1991 |
| JP | 01-118692 | 5/1989 |

(Continued)

OTHER PUBLICATIONS

Z. Richard Zhang, Roger W. Wygant, Anthony V. Lyons and Frank A. Adamsky, "How Coating Structure Relates to Performance in Coated SBS Board: A Fundamental Approach", 1999 Tappi Coating Conference, May 1999.

(Continued)

*Primary Examiner* — Aaron S Austin
*Assistant Examiner* — Megha Mehta
(74) *Attorney, Agent, or Firm* — MeadWestvaco Intellectual Property Group

(57) ABSTRACT

A basecoat including a pigment blend, the pigment blend including at least a calcined clay and a hyper-platy clay, the hyper-platy clay having a shape factor of at least about 40:1.

17 Claims, 3 Drawing Sheets

Sediment Void Volume as a Function of Calcined Clay Content
For Trinary Mixtures of Hyperplaty Clay, Calcined Clay and #2 Clay

(56) References Cited

U.S. PATENT DOCUMENTS

| | | | |
|---|---|---|---|
| 6,777,075 B2 | 8/2004 | Concannon et al. | |
| 6,802,938 B2 | 10/2004 | Mohan et al. | |
| 6,866,906 B2 | 3/2005 | Williams et al. | |
| 7,208,039 B2 | 4/2007 | Jones et al. | |
| 7,306,668 B2 | 12/2007 | Pring et al. | |
| 7,425,246 B2 | 9/2008 | Urscheler | |
| 7,504,002 B2 | 3/2009 | Brelsford et al. | |
| 2003/0085012 A1* | 5/2003 | Jones et al. | 162/181.8 |
| 2004/0065423 A1 | 4/2004 | Swerin et al. | |
| 2004/0229063 A1 | 11/2004 | Concannon et al. | |
| 2005/0039871 A1 | 2/2005 | Urscheler et al. | |
| 2006/0009566 A1 | 1/2006 | Jones et al. | |
| 2006/0124033 A1 | 6/2006 | Pruett et al. | |
| 2007/0169902 A1 | 7/2007 | Brelsford et al. | |
| 2008/0060774 A1 | 3/2008 | Zuraw et al. | |
| 2008/0311416 A1 | 12/2008 | Kelly et al. | |
| 2009/0239047 A1 | 9/2009 | Fugitt et al. | |
| 2009/0297808 A1 | 12/2009 | Fugitt et al. | |

FOREIGN PATENT DOCUMENTS

| | | |
|---|---|---|
| JP | 2009001953 | 1/2009 |
| JP | 2009013513 | 1/2009 |
| WO | 98/51860 | 11/1998 |
| WO | 01/14014 | 3/2001 |
| WO | 2006/033952 | 3/2006 |
| WO | 2009/091406 | 9/2009 |

OTHER PUBLICATIONS

Z.Richard Zhang, Roger W. Wygant and Anthony V. Lyons, "A Fundamental Approach to Understand the Relationship Between Top Coat Structure and Paper Performance", TAPPI Journal, vol. 84, No. 3, Mar. 2001.

R.W. Wygant, "Coating Pigment Formulation Selection to Optimize the Quality of Matte Lightweight-Coated Paper", 2003 TAPPI Spring Technical Conference, May 2003.

R.W. Wygant, "Multi-Pigment Formulations Contribute to the Rise of Matte LWC: formulations for matte coatings in acid systems have been developed and tested", TAPPI Solutions! for People, Process, and Paper, May 2003.

R.W. Wygant, "Coating Formulation Optimization", 2004 TAPPI Coating and Graphic Arts Conference, May 2004.

Robert J. Pruett, Jun Yuan, Bomi M. Bilimoria, Roger W. Wygant and Anthony V. Lyons, "Fine Platy Kaolin Composition", European Patent EP1587882, Jul. 22, 2004.

Richard Gagnon, Jan Walter, Joel Kendrick, Rajan Iyer, Leslie McLain, Roger Wygant, "Metered Size Press Coating Formulation Design for Fiber Reduction", TAPPI 2007 Coating and Graphics Arts Conference, Miami, FL, USA, Apr. 2007.

Roger Wygant, Richard Gagnon, Joel Kendrick, Jan Walter, "Fiber Savings Through New MSP Formulation Strategies", Pulp and Paper, Nov. 2007.

Wygant, J. Kendrick, J. Walter, "Metered Size Press Pigmentation for Fiber Reduction," TAPPI 2008 Coating and Graphic Arts Conference, Dallas, TX, May 2008.

Benny Hallam, Chris Nutbeem, Tatsuya Asano, "Optimisation of Steep Carbonate Coating Formulations With Ultra Fine Platy Kaolin", Tappi Coating and Graphic Arts Conference, Miami, May 2007.

Preston J.S., Toivakka M., Heard P.J., "Visualisation, Modelling and Image Analysis of Coated Paper Microstructure: Particle Shape—Microstructure Interrelations" Proc. 2nd IPEC Conference Tianjin China May 9-11, pp. 833-839 (Date Unknown).

Preston J.S. Husband J.C., Norouzi N., Blair D., Heard P., "The Measurement and Analysis of the Distribution of Fountain Solution in Kaolin and Calcium Carbonate Coatings" Proc 2008 Tappi PaperCon, Dallas Tx May 4-7, 2008.

J.C.Husband, J.S.Preston, L.F.Gate, A.Storer and P.Creaton, "A Study of In-Plane and z-direction Strength of Coating Layers with varying Latex Content", 6th International Paper and Coating Chemistry Symposium, Stockholm, Jun. 7-9, 2006, published in TAPPI J., 6, 12, 10-16, 2008.

Preston J.S., Hiorns A.G., Heard P., Parsons D.J. "Design of coating structure for flexographic printing" Proc. 2007 Tappi Coating Conference, Miami Apr. 7.

Husband J.C., Preston J.S., Gate L.F., Blair D., Creaton P.,"Factors affecting the printing strength of kaolin based coatings" Proc. 2007 Tappi Coating Conference, Miami Apr. 7.

Preston J.S., Nutbeem C., Heard P.J., Wygant R. "Coating Structure Requirements for Improved Rotogravure Printability and Reduced Ink Demand" Tappi Int Printing & Graphic Arts Conf., Cincinnati , Sep. 20-22, 2006.

Elton N.J., Preston J.S., "Polarized light reflectometry for studies of paper coating structure—Part II. Application to coating structure, gloss and porosity" Tappi Journal Aug. 2006, vol. 5, No. 8, pp. 10-16.

Dr Sanna Rousu, Dr Janet Preston, Jan Gustafsson, Dr Peter Heard, "Interactions between UV Curing, hybrid-UV and sheetfed Offset Inks and Coated Paper—Part 2 Commercial print trials" TAGA Journal, vol. 2, Edition 3, Apr. 2006, pp. 174-189.

Dr Janet Preston, Dr Sanna Rousu, Dr Roger Wygant, Mr John Parsons, Dr Peter Heard, "Interactions between UV curing offset inks and coated paper—Part 1 Laboratory Investigations" TAGA Journal, vol. 2, Edition 2, Nov. 2005, pp. 82-98.

Hiorns A.G., Preston J.S., "Optimization of Coating, Paper Key to Blade and MSP Coater use" Pulp & Paper, Jul. 2005 vol. 79, No. 7 pp. 44-47.

C. Nutbeem, J.C. Husband and J.S. Preston, "The role of pigments in controlling coating structure" 2005 PITA coating conf Bradford.

Preston J., Hiorns T.K, Husband J., Nutbeem C., "Overview of coating structure and influence of applicator type", Location and Date Unknown.

Preston J.S., Daun M., Nutbeem C., Jones A., "Attaining print performance through pigment engineering", Presented at the 1999 PTS Coating Conference Munich Sep. 1999.

Preston J.S., Nutbeem C., Parsons D.J., Jones A., "The printability of coated papers with controlled microstructures", Presented at the 1999 PITA Conference, Edinburgh.

Brociner, R.E. and Beazley, K.M., "The influence of the coating pigment on missing dots in LWC gravure paper", Tappi J., 63 (5):55 (1980).

Elton, N.J., Gate, L.F., Hooper, J.J., "Texture and orientation of kaolin in coatings", Clay Minerals, 34, 89-98 (1999).

Adams, J.M., "Particle size and shape effects in materials science : examples from polymer and paper systems", Clay Minerals, 28, 509-530 (1993).

J.C.Husband and A.V.Lyons, "Engineered Coating Clays for Future Needs", 7th International Conference on New Available Technologies, Jun. 4-6, 2002, Stockholm. Proceedings p. 191-195. Published by SPCI.

J.C.Husband, J.S.Preston, L.F.Gate, A.Storer and P.Creaton, "The Influence of Pigment Particle Shape on the In-plane Tensile Strength Properties of Kaolin-based Coating Layers", TAPPI Advanced Coating Fundamentals Symposium, Turku, Feb. 8-10, 2006. Published in Conference Proceedings, p. 67-80, and in TAPPI J., 5, 12, 3-8, 2006.

J.C.Husband, J.S.Preston, L.F.Gate, P.Creaton and D.Blair, "Factors Affecting the Printing Strength of Kaolin-based Paper Coatings", TAPPI Coating Conference, Miami, Apr. 22-25, 2007. Published in Conference Proceedings, and in TAGA J., 4, p. 84-100 (2008).

J.C.Husband, "Use of High Aspect Ratio Kaolin as a tool to Control the Strength and Stiffness Properties of Coated Paper", 50th Japan TAPPI Annual Meeting, Takamatsu, Oct 10-12, 2007. Published in Japan TAPPI Journal, Jun. 2008.

J.S.Preston, J.C.Husband, N.Norouzi, D.Blair and P.J.Heard, "The Measurement and Analysis of the Distribution of Fountain Solution in Kaolin and Calcium Carbonate Containing Coatings", TAPPI Coating Conference, Dallas, May 4-7, 2008. Published in Conference Proceedings.

Hiorns A.G., Preston J.S. and Fogelholm R., "The role of the base paper in controlling MSP and Spray LWC paper quality", PITA Coating Conference, Bradford, Mar. 2005.

(56) References Cited

OTHER PUBLICATIONS

Preston J.S. and Hiorns A.G., "A comparison of LWC papers produced using Blade and MSP coaters", Paper Technology, vol. 45, No. 6, Jul. 2004.

Drage, P.G.; Hiorns, A.G.; Parsons, D.J.; Coggon, L., "Factors governing print performance in offset printing of matt papers", PTS Coating Symposium, Munich, Sep. 1997.

Hiorns, A.G.; Sharma, S., "Possibilities for upgrading woodcontaining papers by coating with a metered size-press", Pulp & Paper Canada, 97:2, 1996.

Hiorns, A.G., Drage. P.G., "Surface quality enhancement by selective pigmentation", 10th PTS Symposium of Papermaking, Munich, Sep. 1992.

Hiorns A.G., Kent, D.F, Parsons D.J. and Underwood J., "Enhanced performance through multilayer coating",TAPPI Coating Conference, Toronto, Apr. 2005.

Hiorns A.G. and Winter H., "Effect of kaolin addition to calcium carbonate precoats: Part 2—MSP coating", TAPPI Coating Conference, Baltimore, May 2004.

Hiorns A.G. and Eade T., "Particle packing of blocky and platey pigments—A comparison of computer simulation and experimental results", TAPPI Advanced Coating Fundamentals Symposium, Chicago, May 2003.

Hiorns A.G. and Eade T., "Effect of kaolin addition to calcium carbonate precoats", TAPPI Spring Technical Conference, Chicago, May 2003.

Hiorns, A.G., "Calendering response of calcium carbonates in double coated woodfree paper", TAPPI Coating Conference, San Diego, May 2001.

Hiorns, A.G., "Producing LWC rotogravure paper on a metered size press", TAPPI Metered Size Press Forum III, Washington DC, Apr. 2000.

Hiorns, Anthony et al., "Effects of Kaolin Addition to Calcium Carbonate Precoats: Part 2: MSP Coating," TAPPI Coating Conference, Baltimore, Maryland (May 2004).

US, Office Action, U.S. Appl. No. 12/326,430 (Apr. 9, 2009).
US, Final Office Action, U.S. Appl. No. 12/326,430 (Jul. 8, 2009).
US, Office Action, U.S. Appl. No. 12/326,430 (Oct. 22, 2009).
US, Interview Summary, U.S. Appl. No. 12/326,430 (Nov. 24, 2009).
US, Final Office Action, U.S. Appl. No. 12/326,430 (Jan. 25, 2010).
US, Advisory Action, U.S. Appl. No. 12/326,430 (Mar. 31, 2010).
US, Examiner's Answer, U.S. Appl. No. 12/326,430 (Jul. 1, 2010).
US, Office Action, U.S. Appl. No. 12/412,773 (Sep. 29, 2009).
US, Notice of Allowance, U.S. Appl. No. 12/412,773 (Dec. 16, 2009).
US, Notice of Allowance, U.S. Appl. No. 12/412,773 (Apr. 29, 2010).
US, Issue Notification, U.S. Appl. No. 12/412,773 (Jun. 16, 2010).
PCT, International Search Report, International Application No. PCT/US2009/000467 (mailed Aug. 25, 2009; published Sep. 24, 2009).
PCT, International Search Report, International Application No. PCT/US2009/038865 (mailed Aug. 28, 2009; published Dec. 3, 2009).

* cited by examiner

BASECOAT AND ASSOCIATED PAPERBOARD STRUCTURE INCLUDING A PIGMENT BLEND OF HYPER-PLATY CLAY AND CALCINED CLAY

PRIORITY

The present patent application claims priority from U.S. Ser. No. 61/171,213 filed on Apr. 21, 2009, the entire contents of which are incorporated herein by reference.

FIELD

The present patent application is directed to coatings for paperboard and, more particularly, to basecoats as well as smooth paperboard structures formed with the disclosed basecoats.

BACKGROUND

Paperboard is used in various packaging applications. For example, coated unbleached kraft is used to package beverage containers, frozen foods, cereals and a wide variety of other food and non-food consumer goods. Other forms of bleached and unbleached coated paperboard are used for a variety of packaging options in food service and consumer products.

Accordingly, there is a demand for paperboard that has a generally smooth surface with few imperfections to facilitate the printing of high quality text and graphics, thereby enhancing the shelf presence and brand appeal of products packaged in paperboard.

Conventionally, paperboard smoothness is achieved by mechanically pressing the sheet in a series of rolls or calenders. Calendering can occur before and after coating, and may be achieved by a variety of means. For example, wet stack calendaring is typically used prior to coating and utilizes water boxes to supply water to moisten the surface of the board, making the fibers more easily compressed. Hot roll calendaring may also be performed, using either hard or soft heated rolls to plasticize the fibers in the surface. However, mechanically pressing the sheet results in a decrease in the thickness (caliper) of the sheet structure, thereby resulting in a decrease in desired mechanical properties (e.g., stiffness) or requires the use of additional fiber in the sheet (i.e., increase basis weight) to maintain bulk.

Alternatively, manufacturers have attempted to smooth the surface of paperboard by coating the entire surface with a basecoat comprised of various pigments, such as clay, calcium carbonate, $TiO_2$ and the like, then overcoating this base with a second and sometimes even a third coating referred to as a topcoat. Various combinations of basecoat pigments have been demonstrated in the prior art, such as blends of hydrous kaolin clays. Along with hydrous kaolin (primarily the mineral kaolinite which has been directly mined), particulate kaolins also exist in calcined and chemically aggregated forms. Chemically aggregated kaolins are produced by treating hydrous kaolin with chemical agents to alter its physical structure and properties, resulting in a material that is lower in density and higher in scattering coefficient. Calcined kaolins are obtained by processing hydrous kaolin at high temperatures, and result in a microstructure resembling that of chemical aggregates. However, both of these processes result in higher pigment costs. Pigment blends must be optimized for the properties desired in the finished paperboard coating, as well as for cost, as the use of relatively high quantities of specialized pigments substantially increases the cost of preparing smooth and highly printable paperboard.

Accordingly, there is a need for a basecoat and associated paperboard structure that maintains paperboard bulk and provides the desired smoothness for high quality printing, while reducing manufacturing cost.

SUMMARY

In one aspect, the disclosed basecoat may include a pigment blend including a calcined clay component and a hyper-platy clay component, wherein the hyper-platy clay component has a shape factor of at least about 40:1.

In another aspect, the disclosed paperboard structure may include a paperboard substrate having a basis weight of at least 85 pounds per 3000 square feet and a basecoat applied to at least one surface of said paperboard substrate at a coat weight, per side, of at most 12 pounds per 3000 square feet, wherein the basecoat includes a pigment blend comprising a calcined clay component and a hyper-platy clay component, wherein the hyper-platy clay component has a shape factor of at least about 40:1.

Other aspects of the disclosed basecoat and associated paperboard structure including a pigment blend of hyper-platy clay and calcined clay will become apparent from the following description, the accompanying drawings and the appended claims.

DETAILED DESCRIPTION

Figure 1:
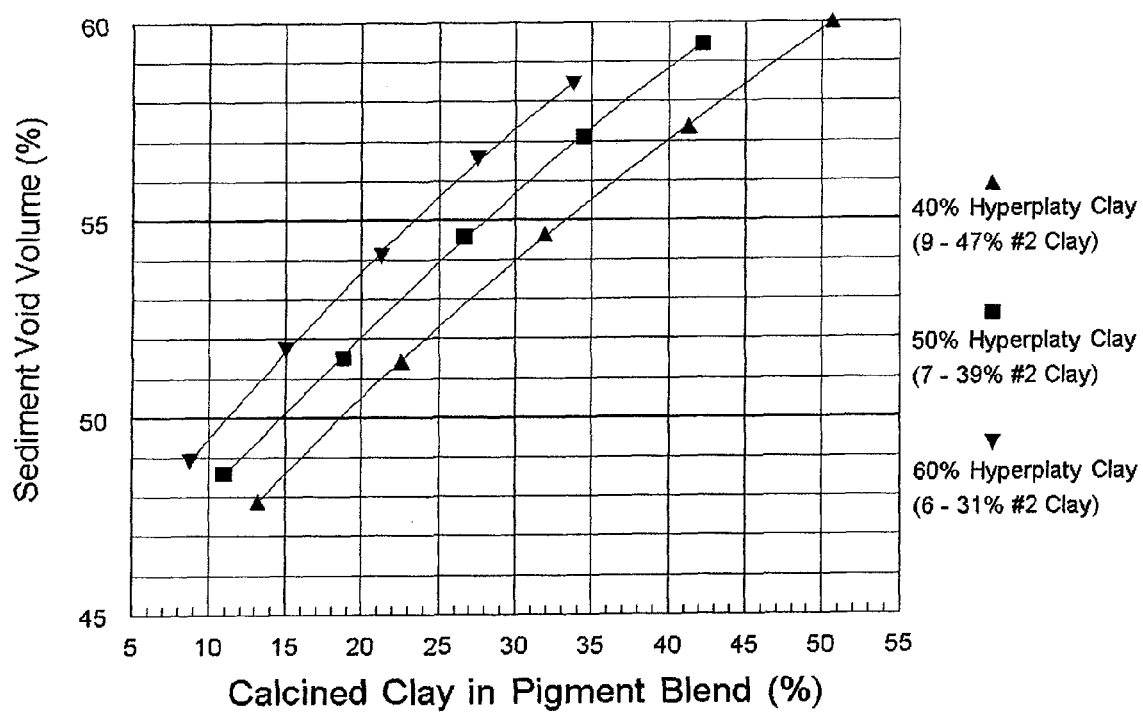
FIG. 1 is a graphical illustration of percent sediment void volume versus percent calcined clay for various ternary pigment blends prepared in accordance with a first aspect of the disclosed basecoat and associated paperboard structure including a pigment blend of hyper-platy clay and calcined clay.

In one aspect, the disclosed basecoat may include a pigment blend of hyper-platy clay and calcined clay. Additional pigments, such as traditional hydrous kaolin clays, may also be present in the pigment blend without departing from the scope of the present disclosure. Indeed, those skilled in the art will appreciate that additional pigments may be added to the pigment blend to act as an extender, thereby reducing the overall cost of the basecoat.

The pigment blend may be dispersed in a carrier, such as water, to facilitate application of the basecoat onto an appropriate substrate, such as paperboard. Additional components, such as binders, stabilizers and dispersing agents, may be added to the pigment blend and carrier slurry to form the basecoat without departing from the scope of the present disclosure.

The hyper-platy clay component of the pigment blend of the disclosed basecoat may be any platy clay having a relatively high shape factor. "Shape factor," as used herein, is a measure of the ratio of particle diameter to particle thickness for a population of particles of varying size and shape. For example, shape factor may be measured using the electrical conductivity methods, apparatuses and equations described in U.S. Pat. No. 5,576,617 to Webb et al., the entire contents of which are incorporated herein by reference.

In one aspect, the hyper-platy clay component of the pigment blend may include a platy clay wherein the clay particles have a shape factor of about 40:1 or more. In another aspect, the hyper-platy clay component may include a platy clay wherein the clay particles have a shape factor of about 50:1 or more. An example of such a hyper-platy clay is CONTOUR® 1180 available from Imerys Pigments, Inc. of Roswell, Ga. In yet another aspect, the hyper-platy clay component may include a platy clay wherein the clay particles have a shape factor of about 90:1 or more. An example of such a hyper-platy clay is BARRISURF® XP-6100 also available from Imerys Pigments, Inc. Additional examples of hyper-platy clays are disclosed in U.S. Pat. No. 7,208,039 to Jones et al.

In another aspect, the hyper-platy clay component of the pigment blend may include platy clay having a relatively high mass median plate diameter. In one particular aspect, the hyper-platy clay component may have a mass median plate diameter of about 4 microns or more. In another particular aspect, the hyper-platy clay component may have a mass median plate diameter of about 10 microns or more. In yet another particular aspect, the hyper-platy clay component may have a mass median plate diameter of about 13 microns or more. The mass median plate diameter is measured by the median SEDIGRAPH equivalent spherical diameter method and the shape factor measurement described herein above.

The calcined clay component of the pigment blend of the disclosed basecoat may be any clay that has undergone a calcination process. In one particular aspect, the calcined clay component of the pigment blend may include a calcined clay having a mean particle size of at least about 0.6 microns, wherein at most 90 percent of the calcined clay particles are less than about 2 microns in diameter. In another aspect, at most 75% of the calcined clay particles are less than about 2 microns in diameter. In yet another aspect, at most 60% of the calcined clay particles are less than about 2 microns in diameter. An example of such a clay is KAOCAL™ calcined clay available from Thiele Kaolin Company of Sandersville, Ga. The particle size of the calcined clays may be measured using any known technique, such as by sedimentation of the particles in a fully dispersed condition in an aqueous medium using a SEDIGRAPH machine.

Without being limited to any particular theory, it is believed that pigment blends that are formulated to provide relatively high sediment void volumes (i.e., bulkier particle packing) provide high smoothness at relatively low coat weights, thereby reducing raw material costs. Furthermore, it is believed that a pigment blend that includes a hyper-platy clay and a calcined clay yields relatively high and, therefore, desirable sediment void volumes. For example, sediment void volumes in excess of 47 percent may be desired, while sediment void volumes in excess of 50 percent may be more desired, with sediment void volumes in excess of 55 percent may be even more desired, and sediment void volumes in excess of 60 percent being even more desired.

As discussed above, additional pigments (i.e., pigments other than hyper-platy clay and calcined clay) may be incorporated into the pigment blend of the disclosed basecoat to reduce material costs. However, in one aspect, additional pigments should be added at levels that maintain the sediment void volume in the desired range. In one example, additional pigments may comprise at most about 60 percent of the pigment blend of the disclosed basecoat. In another example, additional pigments may comprise at most about 50 percent of the pigment blend of the disclosed basecoat. In yet another aspect, additional pigments may comprise at most about 40 percent of the pigment blend of the disclosed basecoat. In yet another aspect, additional pigments may comprise at most about 30 percent of the pigment blend of the disclosed basecoat.

One appropriate technique for measuring sediment void volume includes preparing a pigment blend sample having the desired quantities of the hyper-platy clay component and the calcined clay component, as well as any additional pigments. The pigment blend sample is then diluted with water to 50 percent by weight solids to provide a slurry. A 70 gram sample of the slurry is placed into a centrifuge tube and spun at about 8000 g for about 90 minutes. The sample is then removed from the centrifuge and the clear supernatant liquid is separated and weighed. The sediment is typically packed densely enough that the supernatant liquid is easy to pour off. Based upon the weight of the water removed, the weight of water still contained in the voids of the sediment may be calculated. Then, using particle densities, the weight of water in the voids may be converted into percent sediment void volume.

Figure 2:
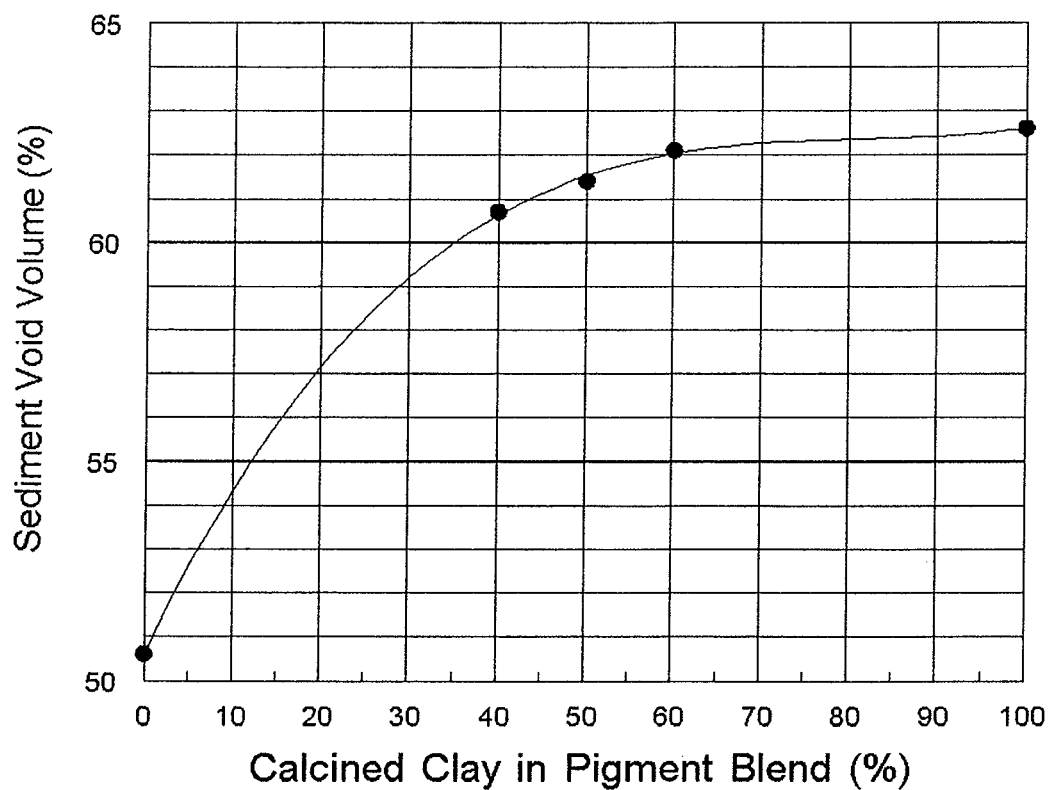
FIG. 2 is a graphical illustration of percent sediment void volume versus percent calcined clay for various binary pigment blends prepared in accordance with a second aspect of the disclosed basecoat and associated paperboard structure including a pigment blend of hyper-platy clay and calcined clay.
Figure 3:
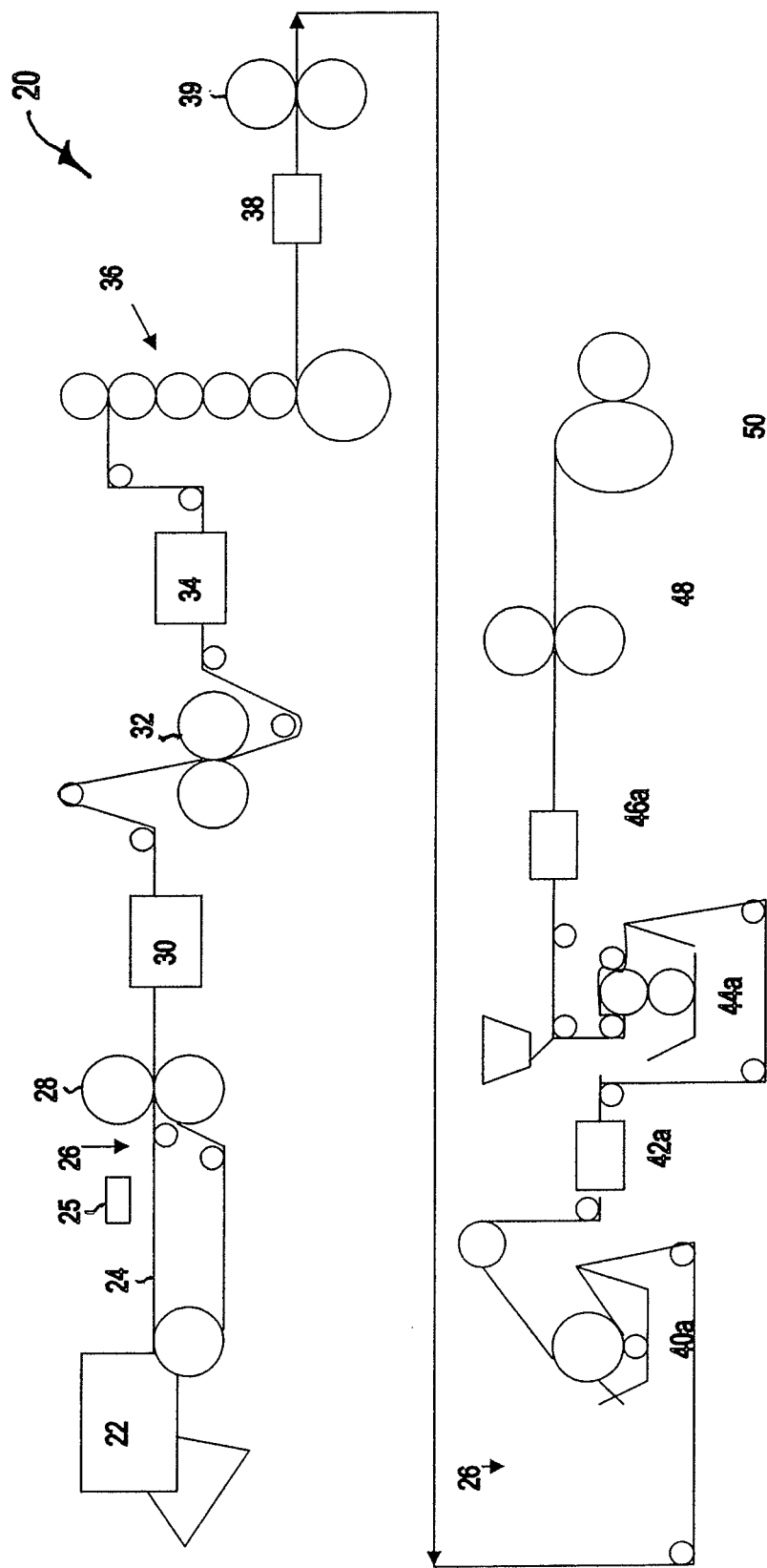
FIG. 3 is a process flow diagram illustration an exemplary process for preparing the disclosed paperboard structure.

The sediment void volumes of exemplary ternary pigment blends (hyper-platy clay, calcined clay and #2 clay) are plotted in FIG. 1 against the percent by weight of the calcined clay component in the ternary pigment blends. The sediment void volumes of exemplary binary pigment blends (hyper-platy clay and calcined clay only) are plotted in FIG. 2 against the percent by weight of the calcined clay component in the binary pigment blends.

Those skilled in the art will appreciate that the amount of hyper-platy clay and calcined clay in the pigment blends are both significant drivers of the ultimate sediment void volume level. Furthermore, the curve shown in FIG. 2 indicates that pigment blends having about 40 to about 60 percent by weight calcined clay with the balance hyper-platy clay yield sediment void volumes approaching those achieved using 100 percent calcined clay, while pigment blends having about 60 to about 80 percent by weight calcined clay with the balance hyper-platy clay yield sediment void volumes that are substantially the same as those achieved using 100 percent calcined clay.

Accordingly, those skilled in the art will appreciate that the type of hyper-platy clay and calcined clay used in the pigment blend, as well as the ratio of the hyper-platy clay to the calcined clay in the pigment blend, may be dictated by cost considerations in view of the desired smoothness.

The disclosed basecoats may be applied to a substrate to form a coated structure. In one aspect, the substrate may be a generally planar sheet and the disclosed basecoat may be applied to only one side of the sheet (i.e., a C1S sheet). In another aspect, the substrate may be a generally planar sheet and the disclosed basecoat may be applied to both sides of the sheet (i.e., a C2S sheet).

In one particular aspect, the substrate to which the disclosed basecoat is applied may be a paperboard substrate. As used herein, "paperboard substrate" broadly refers to any paperboard material that is capable of being coated with the disclosed basecoat. Those skilled in the art will appreciate that the paperboard substrate may be bleached or unbleached, and typically is thicker and more rigid than paper. Generally, a paperboard substrate has an uncoated basis weight of about 85 pounds per 3000 $ft^2$ or more. Examples of appropriate paperboard substrates include corrugating medium, linerboard, solid bleached sulfate (SBS) and coated unbleached kraft (CUK).

The disclosed basecoats may be applied to the surface of a paperboard substrate in a quantity sufficient to fill the pits and crevices in the paperboard substrate without the need for coating the entire surface of the paperboard substrate. For example, the disclosed basecoat may be applied to the paperboard substrate using a blade coater such that the blade coater urges the basecoat into the pits and crevices in the paperboard substrate while removing excess basecoat from the surface of the paperboard substrate. In other words, the disclosed basecoat may be applied to a paperboard substrate in a manner that is more akin to spackling, wherein substantially all of the basecoat resides in the pits and crevices in the surface of the paperboard substrate rather than on the surface of the paperboard substrate. Therefore, the disclosed basecoat may provide a paperboard substrate with high surface smoothness by using a relatively small quantity of basecoat.

At this point, those skilled in the art will appreciate that when the disclosed basecoat is used in a blade coater, the spacing between the moving substrate and the blade of the coater may be minimized to facilitate filling the pits and crevices in the surface without substantially depositing the basecoat on the surface of the substrate (i.e., forming a discontinuous film on the surface of the substrate). In other words, the blade of the coater may be positioned sufficiently close to the surface of the moving substrate such that the blade of the coater urges the basecoat into the pits and crevices in the surface of the substrate, while removing excess basecoat from the surface of the substrate.

In one aspect, the disclosed paperboard structure may be prepared by the process 20 illustrated in FIG. 1. The process 20 may begin at the headbox 22 which may discharge a fiber slurry onto a Fourdrinier 24 to form a web 26. The web 26 may have an additional layer of fiber slurry applied by headbox 25 to improve the smoothness of the web 26. The web 26 may pass through one or more wet presses 28 and, optionally, through one or more dryers 30. A size press 32 may be used and may slightly reduce the caliper thickness of the web 26 and an optional dryer 34 may additionally dry the web 26. In one particular aspect, the web 26 may pass through a calender 36, where moisture is added to the web 26 for development of smoothness. Then, the web 26 may pass through another optional dryer 38 and an additional dry calender 39 before passing to the first coater 40a. The first coater 40a may be a blade coater or the like and may apply the basecoat onto the web 26. An optional dryer 42a may dry, at least partially, the basecoat prior to application of the optional topcoat at the second coater 44a. A dryer 46a may dry the topcoat before the web 26 proceeds to the reel 50.

Example

A pigment blend was prepared having 34 percent by weight standard kaolin clay (KAOBRITE™ from Thiele Kaolin Company), 50 percent by weight hyper-platy clay (BARRISURF® XP-6100 from Imerys Pigments, Inc.) and 16 percent by weight calcined clay (KAOCAL™ from Thiele Kaolin Company). In a stationary mixer, a basecoat was prepared by combining the pigment blend with water, binders (protein and latex) and a thickening agent to form a slurry having about 55 percent solids.

Using a blade coater in the manner described above, the basecoat was applied to raw unbleached paperboard stock having a basis weight of about 264 pounds per 3000 ft$^2$ at a coat weight of about 9 pounds per 3000 square feet. The resulting paperboard structure exhibited desired smoothness at a relatively low coat weight.

Although various aspects of the disclosed basecoat and associated paperboard structure including a pigment blend of hyper-platy clay and calcined clay have been shown and described, modifications may occur to those skilled in the art upon reading the specification. The present patent application includes such modifications and is limited only by the scope of the claims.

What is claimed is:

1. A paperboard structure comprising:
   a paperboard substrate formed as a web of fibers defining a plurality of pits in a surface thereof; and
   a basecoat substantially received within said plurality of said pits without substantially completely covering said surface, wherein said basecoat comprises a pigment blend including a calcined clay component and a hyper-platy clay component, wherein said hyper-platy clay component has a shape factor of at least about 40:1, and wherein said pigment blend has a sediment void volume of at least about 50 percent when measured by a technique involving diluting said pigment blend with water to 50% by weight solids, centrifuging a 70 gram sample of the resulting slurry at 8000 g for 90 minutes and calculating the volume of water remaining in the voids of the sediment after pouring off and weighing the supernatant liquid.

2. The paperboard structure of claim 1 wherein said basecoat forms a discontinuous film on said surface of said paperboard substrate.

3. The paperboard structure of claim 1 wherein said basecoat is applied to said paperboard substrate at a coat weight, per side, of at most about 12 pounds per 3000 square feet of said paperboard substrate.

4. The paperboard structure of claim 1 wherein said basecoat is applied to said paperboard substrate at a coat weight, per side, of at most about 11 pounds per 3000 square feet of said paperboard substrate.

5. The paperboard structure of claim 1 wherein said basecoat is applied to said paperboard substrate at a coat weight, per side, of at most about 10 pounds per 3000 square feet of said paperboard substrate.

6. The paperboard structure of claim 1 wherein said shape factor of said hyper-platy clay component is at least about 70:1.

7. The paperboard structure of claim 1 wherein said shape factor of said hyper-platy clay component is at least about 90:1.

8. The paperboard structure of claim 1 wherein said calcined clay component comprises at least about 10 percent by weight of said pigment blend and at most about 60 percent by weight of said pigment blend.

9. The paperboard structure of claim 1 wherein said calcined clay component comprises at least about 15 percent by weight of said pigment blend and at most about 40 percent by weight of said pigment blend.

10. The paperboard structure of claim 1 wherein said pigment blend consists essentially of said hyper-platy clay component and said calcined clay component.

11. The paperboard structure of claim 1 wherein said sediment void volume is at least about 55 percent.

12. The paperboard structure of claim 1 wherein said sediment void volume is at least about 60 percent.

13. The paperboard structure of claim 1 wherein said calcined clay component comprises calcined clay particles, and wherein at most about 90 percent of said calcined clay particles are less than 2 microns in diameter.

14. The paperboard structure of claim 1 wherein said calcined clay component comprises calcined clay particles, and wherein at most about 75 percent of said calcined clay particles are less than 2 microns in diameter.

15. The paperboard structure of claim 1 wherein said calcined clay component comprises calcined clay particles, and wherein at most about 60 percent of said calcined clay particles are less than 2 microns in diameter.

16. The paperboard structure of claim 1 wherein at least one of said calcined clay component and said hyper-platy clay component comprises kaolin.

17. A paperboard structure comprising:
a paperboard substrate having a surface; and
a basecoat applied as a discontinuous film onto said surface, wherein said basecoat comprises a pigment blend including a calcined clay component and a hyper-platy clay component, wherein said hyper-platy clay component has a shape factor of at least about 40:1, and wherein said pigment blend has a sediment void volume of at least about 50 percent when measured by a technique involving diluting said pigment blend with water to 50% by weight solids, centrifuging a 70 gram sample of the resulting slurry at 8000 g for 90 minutes and calculating the volume of water remaining in the voids of the sediment after pouring off and weighing the supernatant liquid.

* * * * *